3,152,129
TRIETHYLENE DIAMINE FUMARATE AND ITS USES IN RECOVERY OF DIAZABICYCLO-OCTANE
Jack Sonbert, 116 Brightwater Court, Brooklyn, N.Y.
No Drawing. Filed July 11, 1963, Ser. No. 294,255
3 Claims. (Cl. 260—268)

This invention relates to a new composition of matter, diazabicyclo-octane fumarate, and its use in the separation and recovery of 1,4 diazabicyclo-(2,2,2) octane, also known and hereinafter referred to as triethylene diamine, from reaction products, mother liquors and solutions of same—anhydrous and aqueous.

The preparation of triethylene diamine currently used in commercial production involves the vapor phase reaction of polyalkamines of heterogeneous composition and there are produced as by-products many alkyl pyrazines and alkyl piperazines boiling in the range of from 150 to 200° C. as well as triethylene diamine. Fractional distillation accomplishes a measure of recovery, but a wide cut must be taken and this fraction requires a crystallization and washing with solvents to purify further. One then obtains a mother liquor containing from 15 to 30% triethylene diamine, as well as foreruns and bottoms from the fractional distillation which contains as much as ten percent triethylene diamine.

A usual method to recover an amine from solution is to precipitate the base as an insoluble salt, isolate it from the mother liquor, and then regenerate the base with alkali, etc. Until now, this has not been practical because all the known salts of triethylene diamine were extremely soluble, and the usual acids were not selective, that is they formed salts with all the bases in the mother liquors, or other solutions being treated.

We have found that fumaric acid selectively precipitates triethylene diamine in aqueous and non-aqueous solution. The crystalline product is readily separated by filtration, can be washed and dried to give an almost white powder which on recrystallization from hot water has a melting point of 218° C. and assaying 47% triethylene diamine and 53% fumaric acid. It is evidently a neutral salt of one molecule of triethylene diamine and one molecule of fumaric acid. It has a molecular weight of 222, and in an aqueous slurry the pH is 3.4. The formula is $C_6H_{12}N_2 \cdot C_4H_4O_4$. Triethylene diamine fumarate is slightly soluble in cold water—1 gm. in 35 cc. water; very soluble in hot water. It is insoluble in methanol, acetone, toluol, etc. When cooked with strong acids, the fumaric acid is displaced and may be recovered, leaving the respective acid salt of triethylene diamine in the solution. On the other hand, cooking with caustic solution liberates the triethylene diamine and sodium fumarate is formed. The triethylene diamine may then be recovered from the solution by suitable means.

The following examples demonstrate the treatment of a solution of crude triethylene diamine in accordance with the present invention.

*Example I*

100 cc. of a solution containing approximately 25% triethylene diamine plus alkyl piperazines, alkyl pyrazines and diethylene triamine, each in amounts from 2 to 5% is treated with 36 grams of fumaric acid and 100 cc. water. Heat to 90° C. with stirring, cool. When solution is at 20° C. or lower, filter off the tan salt which has precipitated. Wash with a little methanol, dry. There is obtained 58 grams of technical triethylene diamine fumarate, M.P. 210° C.

This salt is digested with 200 cc. of 25% caustic solution for a half hour at 95–100° C. with stirring. The slurry is now extracted several times with hot xylol to remove the triethylene diamine. The combined xylol extracts are distilled to obtain pure triethylene diamine.

*Example II*

The technical triethylene diamine fumarate is digested with 1.5 molar equivalents of concentrated hydrochloric acid at 95° C. with stirring for one hour. The slurry is cooled, and the precipitate fumaric acid is filtered off. The filtrate is now concentrated to ⅓ volume and solid caustic added to neutralize the hydrochloric acid, free and combined. A precipitate of triethylene diamine hydrate forms and on cooling, may be filtered off. This product may now be distilled to obtain pure triethylene diamine in excellent yield.

I claim:
1. Triethylene diamine fumarate.
2. The method for the separation and recovery of triethylene diamine from a liquid mixture containing in addition to triethylene diamine, compounds boiling in the range of from 150 to 200° C. and formed as by-products in the vapor phase production of triethylamine diamine from polyalkamines, which method comprises the steps of adding fumaric acid to said mixture to precipitate triethylene diamine fumarate therefrom, and converting the triethylene diamine fumarate to triethylene diamine.
3. The method as in claim 2 wherein the triethylene diamine fumarate is successively treated with hydrochloric acid and sodium hydroxide to form triethylene diamine hydrate.

References Cited in the file of this patent

Hromatka: Chemische Berichte, vol. 75, pp. 1302–1310 (1942).

Mann et al.: Journal Chemical Society (London), pp. 1881–1887 (1957).